(12) United States Patent
Ling et al.

(10) Patent No.: US 11,554,655 B2
(45) Date of Patent: Jan. 17, 2023

(54) ENGINE-AND-ELECTRIC-MACHINE ASSEMBLY

(71) Applicant: Jing-Jin Electric Technologies Co., Ltd., Beijing (CN)

(72) Inventors: Xinliang Ling, Beijing (CN); Zhicheng Guo, Beijing (CN); Yao Zhou, Beijing (CN); Ping Yu, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 224 days.

(21) Appl. No.: 17/017,005

(22) Filed: Sep. 10, 2020

(65) Prior Publication Data

US 2021/0078401 A1 Mar. 18, 2021

(30) Foreign Application Priority Data

Sep. 18, 2019 (CN) .......................... 201910882435.6

(51) Int. Cl.
*B60K 6/26* (2007.10)
*B60K 6/405* (2007.10)
(Continued)

(52) U.S. Cl.
CPC ................ *B60K 6/405* (2013.01); *B60K 6/36* (2013.01); *B60K 6/26* (2013.01);
(Continued)

(58) Field of Classification Search
CPC . B60K 6/405; B60K 6/36; B60K 6/26; B60K 2006/4825; H02K 7/006;
(Continued)

(56) References Cited

U.S. PATENT DOCUMENTS 8,884,491 B2 * 11/2014 Kusase ................... B60L 15/20
310/156.49
2003/0102764 A1 6/2003 Kusase
(Continued)

FOREIGN PATENT DOCUMENTS

CN 206135580 U 4/2017
CN 206727746 U 12/2017
(Continued)

OTHER PUBLICATIONS

Office Action (Notice of Reasons for Refusal) dated Oct. 15, 2021, by the Japanese Patent Office in corresponding Japanese Patent Application No. 2020-154522, and an English Translation of the Office Action. (8 pages).
(Continued)

*Primary Examiner* — David J Hlavka
(74) *Attorney, Agent, or Firm* — Buchanan Ingersoll & Rooney PC

(57) ABSTRACT

An engine-and-electric-machine assembly includes an engine and an electric machine, a crankshaft being provided in the engine, the crankshaft including a main body and an extension section that extends out to the exterior of the engine, the extension section forming a rotation shaft of the electric machine, a rotor of the electric machine being mounted on the extension section, and a transition section being provided between the main body of the crankshaft and the extension section, wherein the rotor of the electric machine is connected to the transition section via a flange structure. By connecting the rotor of the electric machine and the crankshaft of the engine by using a flange, instead of using a key connecting structure, the strength of the connection between the rotor and the crankshaft can be improved, and optimize the moment of inertia of the transmission structure between the rotor and the crankshaft.

9 Claims, 3 Drawing Sheets

(51) Int. Cl.
*B60K 6/36* (2007.10)
*B60K 6/48* (2007.10)
*H02K 7/00* (2006.01)

(52) U.S. Cl.
CPC ... *B60K 2006/4825* (2013.01); *B60Y 2200/92* (2013.01); *H02K 7/006* (2013.01)

(58) Field of Classification Search
CPC .......... H02K 11/21; H02K 7/003; H02K 7/10; H02K 7/1815; H02K 1/30; F02B 63/04
See application file for complete search history.

(56) References Cited

U.S. PATENT DOCUMENTS

| | | | | |
|---|---|---|---|---|
| 2005/0133328 | A1* | 6/2005 | Masuya | F16H 45/02 192/3.3 |
| 2005/0150734 | A1* | 7/2005 | Breier | B60K 6/405 903/952 |
| 2006/0220479 | A1* | 10/2006 | Hasegawa | B60L 7/18 310/85 |
| 2018/0370346 | A1* | 12/2018 | Shirley | H02K 7/1815 |

FOREIGN PATENT DOCUMENTS

| | | |
|---|---|---|
| CN | 109017262 A | 12/2018 |
| CN | 208939735 U | 6/2019 |
| CN | 110571976 A | 12/2019 |
| CN | 110601451 A | 12/2019 |
| EP | 3225447 A1 | 10/2017 |
| JP | S59123446 A | 7/1984 |
| JP | 2005057832 A | 3/2005 |
| JP | 2005185038 A | 7/2005 |
| JP | 2014176235 A | 9/2014 |

OTHER PUBLICATIONS

Office Action (Communication) dated Feb. 5, 2021, by the European Patent Office in corresponding European Patent Application No. 20193048.4. (4 pages).

Office Action (Communication) dated Apr. 16, 2021, by the European Patent Office in corresponding European Patent Application No. 20193048.4. (7 pages).

* cited by examiner

ENGINE-AND-ELECTRIC-MACHINE ASSEMBLY

TECHNICAL FIELD

The present disclosure relates to a powertrain assembly, and particularly relates to an engine-and-electric-machine assembly, which is used to drive a vehicle or generate electricity.

BACKGROUND

Hybrid power vehicles have the advantages of energy saving, emission reduction and long endurance mileage, and are electric vehicles that are suitable for sustainable development. Currently, the engine-and-electric-machine assemblies of hybrid-powered vehicles are mostly the simple mechanical integration of the engine and the electric machine, wherein the rear end of the engine is connected to a flywheel, and the input shaft of the electric machine is connected to the flywheel via a torsional shock absorber, which has the disadvantages such as low integration level, too many components, high mass/weight, large volume, low reliability and high cost. They cannot satisfy the requirements to become full-scale production, and are difficult to meet miniaturization and light weight targets of the drive systems.

In the prior art, a range extender that has a higher level of integration has already been disclosed. As shown in FIGS. 1 and 2, it is particularly an engine-and-electric-machine assembly, comprising an engine 8 and an electric machine 9. The engine 8 is in the fuel mode. The electric machine 9 may be an electric generator or an ISG electric machine, and may also be an electric motor. A crankshaft 7 is provided in the engine 8. The crankshaft 7 is provided with an extension section 7-3 that extends out to the exterior of the engine 8. The extension section 7-3 forms a rotation shaft 6 of the electric machine 9. A rotor 3 of the electric machine 9 is mounted on the extension section 7-3.

The rotor of the electric machine 9 and the rotation shaft 6 are connected via a key, for example a spline or a flat key, or by interference fitting. As shown in FIG. 2, the crankshaft 7 has a key slot on the extension section 7-3. If the connection is via a spline, an external spline may be on the extension section 7-3, and the internal spline on the rotor of the electric machine 9, or vice versa.

The range extender adopts a structure that integrates the engine and the electric machine as one system, which improves the integration level of the engine-and-electric-machine assembly, and effectively reduces the weight and the volume of the engine-and-electric-machine assembly. However, the transmission connecting structure is still required to be improved.

SUMMARY

With regards to the above mentioned problems in the prior art, the present disclosure provides an engine-and-electric-machine assembly, which, by connecting the rotor of the electric machine and the crankshaft of the engine by using a flange, instead of using a key connecting structure, can improve the strength of the connection between the rotor and the crankshaft, and optimize the moment of inertia of the transmission structure between the rotor and the crankshaft.

To achieve the above objectives, the technical solutions of the present disclosure are realized as follows:

The present disclosure provides an engine-and-electric-machine assembly, comprising an engine and an electric machine, a crankshaft being provided in the engine, the crankshaft comprising a main body and an extension section that extends out to the exterior of the engine, the extension section forming a rotation shaft of the electric machine, a rotor of the electric machine being mounted on the extension section, and a transition section being provided between the main body of the crankshaft and the extension section, wherein the rotor of the electric machine is connected to the transition section via a flange structure.

Optionally, the transition section is provided with an end face that faces the rotor of the electric machine, and the rotor of the electric machine is connected to the end face of the transition section via the flange structure.

Optionally, the rotor of the electric machine comprises an iron-core support, a plurality of main connecting holes are provided at a middle part of the iron-core support, a plurality of secondary connecting holes are correspondingly provided at the end face of the transition section, and the main connecting holes and the secondary connecting holes are aligned and are fastened together by using bolts.

Optionally, a protrusion that faces the transition section is provided at the middle part of the iron-core support, and the main connecting holes are provided at the protrusion.

Optionally, a sleeve is provided at a middle part of the iron-core support, and the sleeve is interference-fitted to the extension section when the rotor of the electric machine is mounted on the extension section to guarantee that the sleeve is concentric with the rotation shaft.

Optionally, a synchro-resolver rotor is mounted and fixed to the sleeve, or a synchro-resolver rotor is mounted and fixed to the extension section.

Optionally, the extension section is provided with a plurality of stepped sections whose diameters sequentially and gradually decrease from a position of the extension section that is connected to the transition section to a tip of the extension section, the sleeve is interference-fitted to a first stepped section of the stepped sections, and an auxiliary bearing is mounted and fixed to one of the middle stepped sections to support the rotation shaft.

Optionally, the main connecting holes are unthreaded holes, the secondary connecting holes are threaded holes, and a quantity of the main connecting holes and the secondary connecting holes is 6-12.

Optionally, a sleeve is provided at a middle part of the iron-core support, and the sleeve is transition-fitted or clearance-fitted to the extension section when the rotor of the electric machine is mounted on the extension section.

Optionally, the transition section comprises a main body and a flange, the flange faces the rotor of the electric machine, a connecting neck is provided between the main body and the flange, and the diameter of the connecting neck is less than the diameter of the main body and the diameter of the flange.

The engine-and-electric-machine assembly, by employing the above structure configuration, has the following advantages:

The present disclosure, by connecting the rotor of the electric machine and the crankshaft of the engine by using the flange structure, improves the strength of the connection between the rotor and the crankshaft, optimizes the moment of inertia of the transmission structure between the rotor and the crankshaft, prevents connection failure due to key damage, and increases the service life of the assembly.

By connecting the rotation shaft of the electric machine and the cooling-fluid pump, wherein the cooling-fluid pump may be an oil pump or a water pump and the rotation shaft drives the cooling-fluid pump to operate while rotating, the present disclosure can provide the cooling fluid to the electric machine, thereby improving the energy usage ratio of the powertrain assembly.

The cooling-fluid pump does not require a power source for driving, which saves the energy consumption of the vehicle, highly integrates the pump, and reduces the manufacturing cost.

Figure 1:
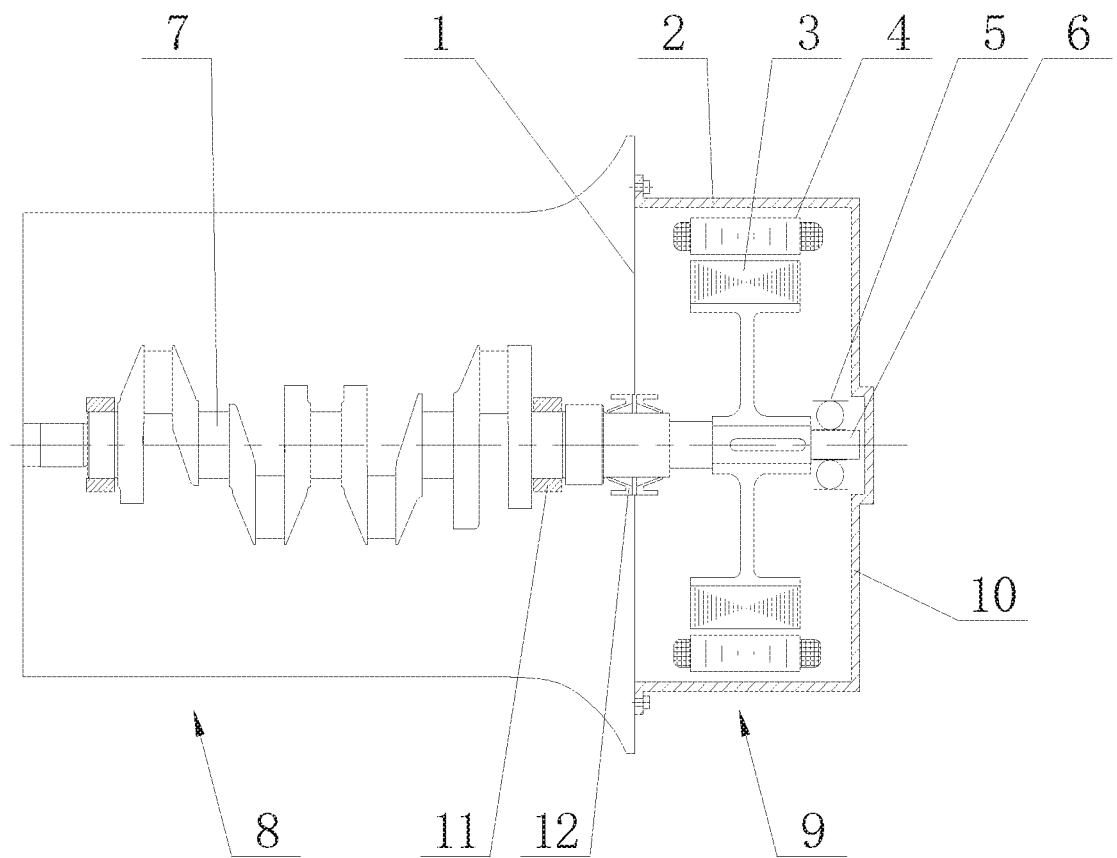
FIG. 1 is a schematic diagram of a connecting structure of an engine and an electric machine in the prior art.
Figure 2:
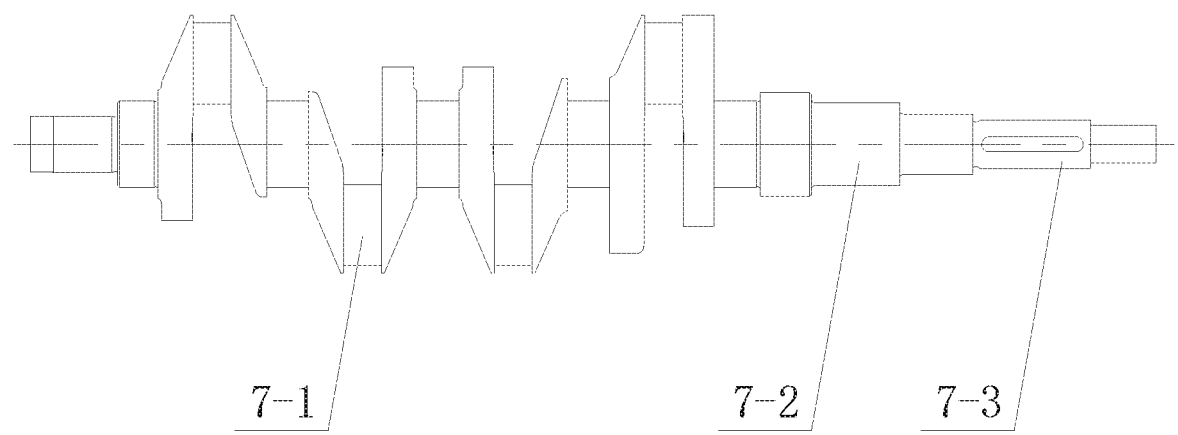
FIG. 2 is a schematic structural diagram of a crankshaft in the prior art.

in the drawings: 1. cylinder block; 2. housing; 3. rotor; 4. stator; 5. auxiliary bearing; 6. rotation shaft; 6-1. first stepped section; 6-2. second stepped section; 6-3. third stepped section; 6-4. fourth stepped section; 7. crankshaft; 7-1. main body; 7-2. transition section; 7-3. extension section; 8. engine; 9. electric machine; 10. right end cap; 11. sliding bearing; 12. dual oil seal; 13. rotor of cooling-fluid pump; 14. stator of cooling-fluid pump; 15. synchro-resolver rotor; 16. synchro-resolver stator; 17. iron-core support; and 17-1. sleeve.

DETAILED DESCRIPTION

The exemplary embodiments of the present disclosure will be described in further detail below by referring to the drawings. Although the drawings illustrate the exemplary embodiments of the present disclosure, it should be understood that the present disclosure can be implemented in various forms, which should not be limited by the embodiments illustrated herein. In contrast, the purpose of providing those embodiments is to more clearly understand the present disclosure, and to completely convey the scope of the present disclosure to a person skilled in the art.

The First Embodiment

Figure 3:
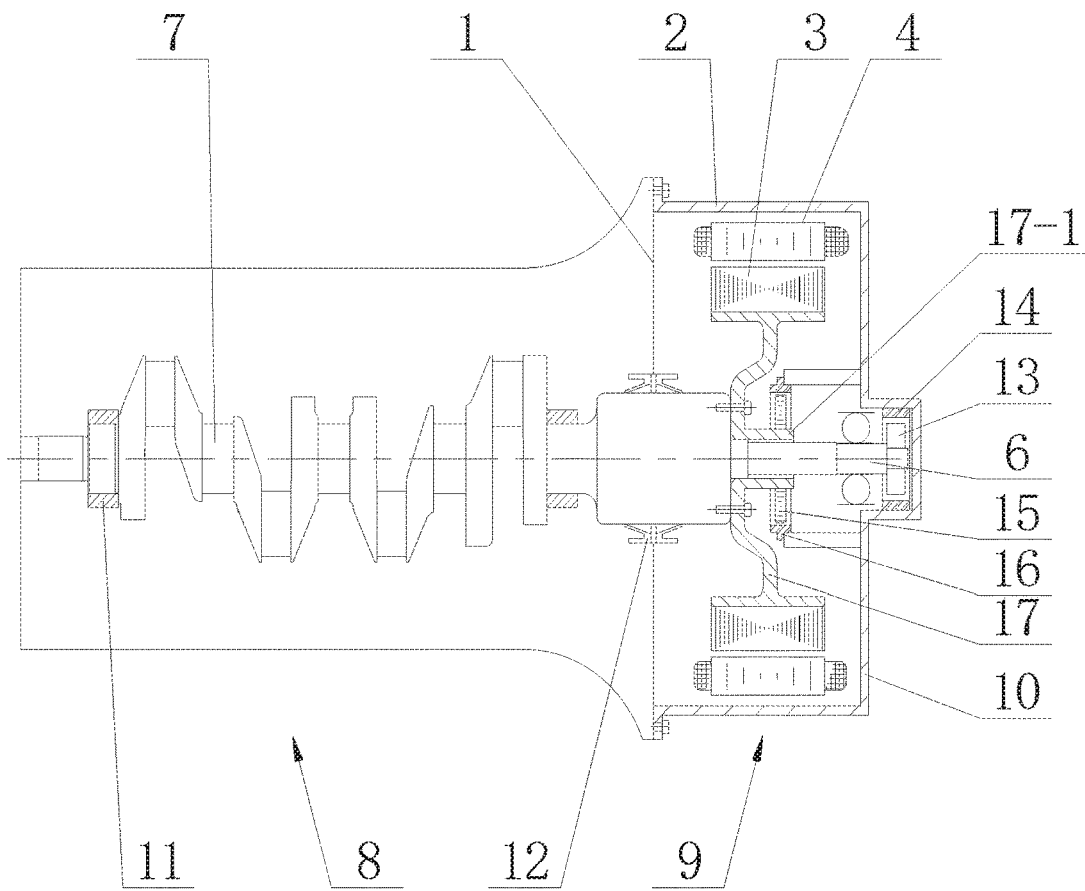
FIG. 3 is a schematic diagram of the connecting structure of the engine and the electric machine according to the first embodiment of the present disclosure.
Figure 4:
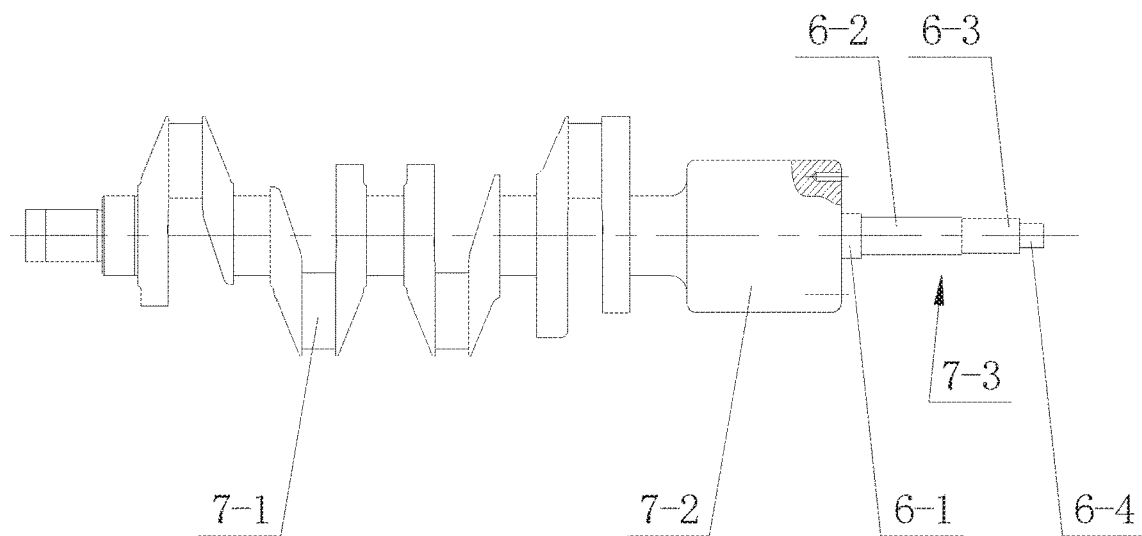
FIG. 4 is a schematic structural diagram of the crankshaft according to the first embodiment of the present disclosure.

As shown in FIGS. 3 and 4, in the first embodiment of the present disclosure, an engine-and-electric-machine assembly comprises an engine 8 and an electric machine 9. The engine 8 is in the fuel mode. The electric machine 9 may be an electric generator or an ISG electric machine, and may also be an electric motor.

A crankshaft 7 is provided in the engine 8. The crankshaft 7 is provided with an extension section 7-3 that extends to the exterior of the engine 8. The extension section 7-3 forms a rotation shaft 6 of the electric machine 9. A rotor 3 of the electric machine 9 is mounted on the extension section 7-3.

The tip of the rotation shaft 6 is connected to a cooling-fluid pump. The rotor of the cooling-fluid pump is mounted and fixed to the rotation shaft 6. While the rotation shaft 6 is rotating, the rotation shaft 6 drives the cooling-fluid pump to operate, to provide cooling fluid to the electric machine 9.

The cooling fluid may be oil or water. The cooling-fluid pump may be a cycloid-rotor/gerotor pump. As shown in FIGS. 3 and 4, the rotor 13 of the cooling-fluid pump is mounted and fixed to a fourth stepped section 6-4 of the rotation shaft 6, and a stator 14 of the cooling-fluid pump is mounted and fixed to a housing 2. When the crankshaft 7 is rotating, the crankshaft 7 can drive the cooling-fluid pump to operate, to cause the cooling fluid to enter the housing of the electric machine 9, to cool the electric machine 9.

A transition section 7-2 is provided between a main body 7-1 of the crankshaft 7 and the extension section 7-3. The rotor of the electric machine 9 is fastened together to an end face of the transition section 7-2 via a flange structure. The end face of the transition section 7-2 is a flush face, which can guarantee that, after the mounting of the rotor of the electric machine 9, the rotor does not incline.

The transition section 7-2 is originally provided for a sealing structure. A dual oil seal 12 seals a spacing between the transition section 7-2 and a sealing slot on the cylinder block 1, thereby sealing the engine 8 and the electric machine 9 in both directions. By connecting the transition section 7-2 via the flange, the strength of the connection between the crankshaft 7 and the rotor of the electric machine 9 can be improved.

Particularly, the rotor of the electric machine 9 comprises an iron-core support 17. A winding or a magnetic steel is provided on the circumference of the iron-core support 17. A plurality of main connecting holes are provided at the middle part of the iron-core support 17. A plurality of secondary connecting holes are correspondingly provided at the end face of the transition section 7-2. The main connecting holes and the secondary connecting holes are aligned and are fastened together by using bolts. The main connecting holes are unthreaded holes. The secondary connecting holes are threaded holes. The quantity of the main connecting holes and the secondary connecting holes may be selected to be 6-12.

As shown in FIG. 3, in order to access the transition section 7-2 to facilitate the connection, a protrusion that faces the transition section 7-2 is provided at the middle part of the iron-core support 17, and the main connecting holes are provided at the protrusion. Therefore, the winding of the rotor and the stator are not required to be provided leftwardly, thereby avoiding the other components inside the electric machine 9, to leave the room for the installation of the other components.

A sleeve 17-1 is provided at the middle part of the iron-core support 17. Preferably, the sleeve 17-1 is interference-fitted to the extension section 7-3 when the rotor of the electric machine 9 is mounted to the extension section 7-3 to guarantee that the sleeve 17-1 is concentric with the rotation shaft 6.

In order to facilitate the assembling, before the rotor of the electric machine is mounted to the extension section 7-3, the sleeve 17-1 may be heated to cause the inner diameter of the sleeve 17-1 to be greater than the external diameter of the extension section 7-3, and after the assembly is cooled the interference fitting between the sleeve 17-1 and the extension section 7-3 can be formed.

In order to detect the rotation angle of the rotor of the electric machine 9, a synchro-resolver rotor 15 is mounted and fixed to the sleeve 17-1. The synchro-resolver stator 16 is required to be mounted and fixed on the housing 2. The synchro-resolver rotor 15 may also be mounted and fixed to the extension section 7-3, in which case the length of the sleeve 17-1 may be reduced appropriately.

As shown in FIG. 4, the extension section 7-3 is provided with a first stepped section 6-1, a second stepped section 6-2, a third stepped section 6-3 and a fourth stepped section 6-4, whose diameters sequentially and gradually decrease from the position of the extension section 7-3 that is connected to the transition section 7-2 to the tip of the extension section 7-3. The sleeve 17-1 is interference-fitted to the first stepped section 6-1. An auxiliary bearing 5 is mounted and fixed to the third stepped section 6-3 to support the rotation shaft 6. The rotor of the cooling-fluid pump is mounted and fixed to the fourth stepped section 6-4. Optionally, the synchro-resolver rotor 15 may be mounted and fixed to the second stepped section 6-2, and, if the fourth stepped section 6-4 can protrude out of the cooling-fluid pump, may also be mounted and fixed to the tail end of the fourth stepped section 6-4.

Particularly, the rotor 13 of the cooling-fluid pump is connected and fixed to the fourth stepped section 6-4 via a flat key or a spline, or by interference fitting.

Optionally, the sleeve 17-1 and the extension section 7-3 may be connected by transition fitting or clearance fitting, whereby the sleeve 17-1 and the extension section 7-3 can be more easily assembled. Also in order to facilitate the assembling, before the rotor of the electric machine is mounted to the extension section 7-3, the sleeve 17-1 may be heated to cause the inner diameter of the sleeve 17-1 to be greater than the external diameter of the extension section 7-3, and after the assembly is cooled the transition fitting or clearance fitting between the sleeve 17-1 and the extension section 7-3 can be formed.

In the present embodiment, the engine 8 and the electric machine 9 are integrated, and do not have the components for the connection between an electric machine and an engine in conventional solutions, such as a flywheel and a torsional shock absorber, which results in less component parts, a smaller volume, a lighter weight and a more compact structure.

In order to further reduce the parts and reduce the weight, in the present embodiment, the engine 8 and the electric machine 9 are provided adjacent, and the left end of the housing 2 is directly mounted to the cylinder block 1 of the engine, and, particularly, mounted to a front flange face of the cylinder block 1, to form a connection face and a sealing face.

The electric machine 9 is further provided with a right end cap 10, and the housing 2 of the electric machine 9 is manufactured integrally with the right end cap 10. Such a design can simplify the housing structure of the electric machine 9, and further improve the integration level.

In the electric machine 9 a left end cap is eliminated, which can reduce the axial length of the engine-and-electric-machine assembly.

As shown in FIG. 3, a flange is provided at one end of the housing 2 of the electric machine 9 that is connected to the cylinder block 1 of the engine 8, and is connected to the cylinder block 1 of the engine 8 via bolts, and the cylinder block 1 of the engine 8 is required to be provided with threaded holes. A sealing structure is provided at the connection, for example a sealing ring, to seal the interior of the housing of the electric machine 9.

A dual oil seal 12 is provided at the position where the engine 8 and the electric machine 9 abut, to seal bidirectionally the engine 8 and the electric machine 9. The dual oil seal 12 may be provided on the cylinder block 1 of the engine 8, and correspondingly the cylinder block 1 of the engine 8 is required to be provided with a sealing slot to mount the sealing element.

As shown in FIG. 4, the dual oil seal 12 seals a spacing between the transition section 7-2 and the sealing slot on the cylinder block 1, thereby sealing bidirectionally the engine 8 and the electric machine 9.

As shown in FIG. 3, a bearing seat is provided at the right end cap 10 of the electric machine 9, and is used to mount the auxiliary bearing 5 to support the rotation shaft 6 of the electric machine 9. The auxiliary bearing 5 and the rotation shaft 6 are connected by transition fitting or interference fitting, to reduce the radial runout of the rotor 3, to guarantee that the air gap of the electric machine does not vary greatly.

The crankshaft 7 is provided with a sliding bearing 11 at the position where the engine 8 and the electric machine 9 abut. The sliding bearing 11 may be considered as a bearing used commonly by the crankshaft 7 and the rotation shaft 6.

In the present embodiment, the electric machine 9 may be a permanent magnet electric machine, an induction electric machine, a hybrid excited electric machine or a switch reluctance electric machine, and the stator 4 of the electric machine 9 may employ a distributed winding or a concentrated winding.

An oil channel or a water channel is provided inside the housing 2 of the electric machine 9, wherein if the cooling mode is oil cooling an oil channel is required to be provided, and if the cooling mode is water cooling a water channel is required to be provided.

Radiating ribs may be provided on the outer side of the housing 2 of the electric machine 9, to improve the effect of heat dissipation.

The present embodiment, by connecting the rotor of the electric machine and the crankshaft of the engine by using the flange structure, improves the strength of the connection between the rotor and the crankshaft, and optimizes the moment of inertia of the transmission structure between the rotor and the crankshaft.

By connecting the rotation shaft of the electric machine and the cooling-fluid pump, wherein the cooling-fluid pump may be an oil pump or a water pump and the rotation shaft drives the cooling-fluid pump to operate while rotating, the present embodiment can provide the cooling fluid to the electric machine, thereby improving the energy usage ratio of the powertrain assembly.

The cooling-fluid pump does not require a power source for driving, which saves the energy consumption of the vehicle, highly integrates the pump, and reduces the manufacturing cost.

The Second Embodiment

Figure 5:
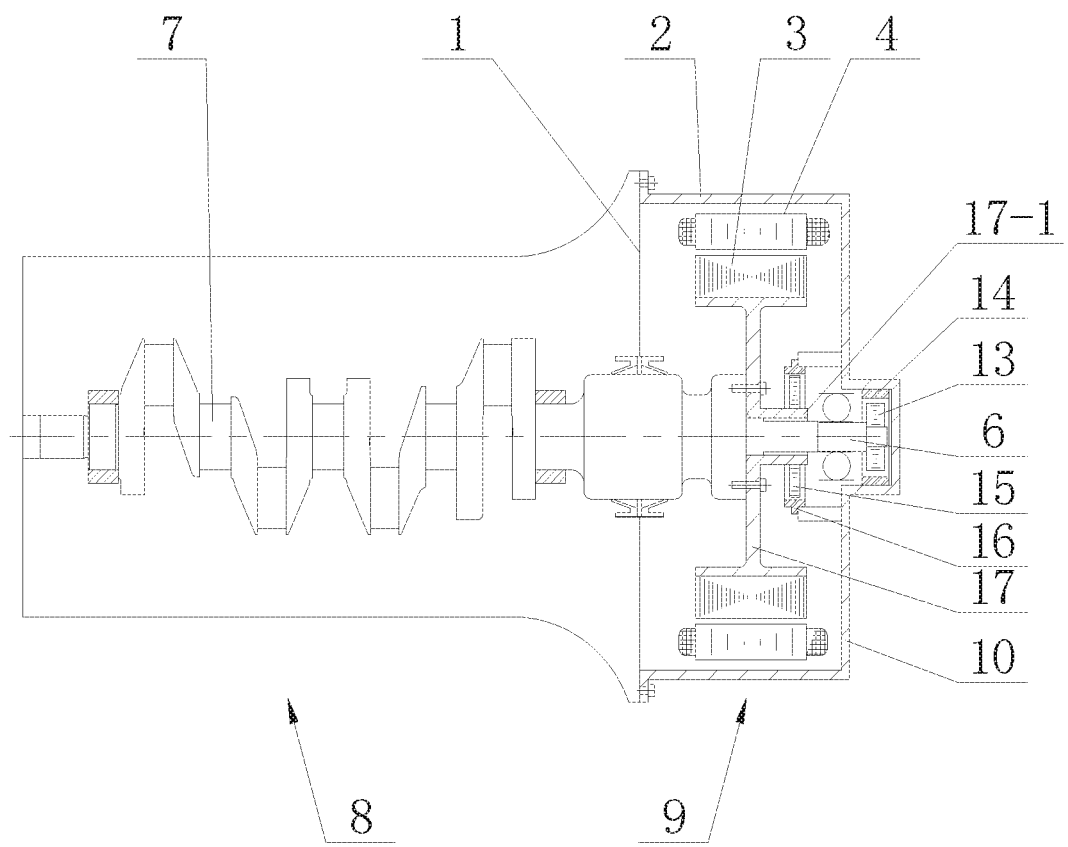
FIG. 5 is a schematic diagram of the connecting structure of the engine and the electric machine according to the second embodiment of the present disclosure.
Figure 6:
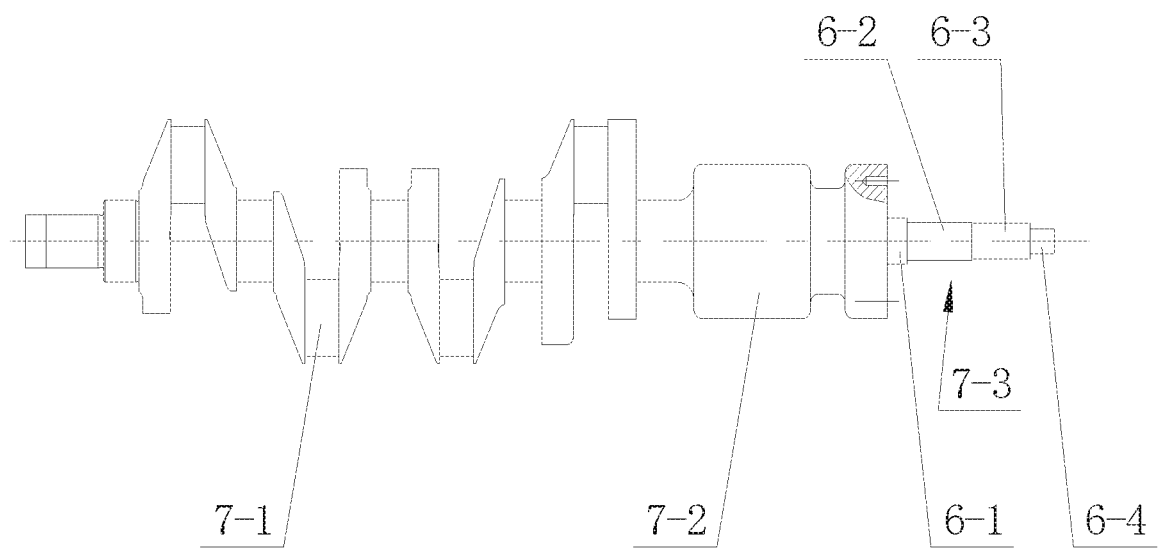
FIG. 6 is a schematic structural diagram of the crankshaft according to the second embodiment of the present disclosure.

FIGS. 5 and 6 show the second embodiment of the present disclosure. In the present embodiment, the transition section 7-2 comprises a main body and a flange, the flange faces the rotor of the electric machine 9, a connecting neck is provided between the main body and the flange, and the diameter of the connecting neck is less than the diameter of the main body and the diameter of the flange.

As shown in FIG. 6, the secondary connecting holes are provided at the end face of the flange that faces the rotor support 17, and the rotor support 17 is fastened to the flange via bolts.

In the present embodiment, the length of the transition section 7-2 is larger than that of the transition section 7-2 of the first embodiment to some extent, and therefore the rotor support 17 is not required to be provided with a protrusion.

The connecting neck can reduce the weight of the transition section 7-2 while satisfying the structural strength.

The other structures of the engine-and-electric-machine assembly of the second embodiment of the present disclosure are the same as those of the first embodiment, and are not described repeatedly here.

The above are merely particular embodiments of the present disclosure. By the information of the present disclosure, a person skilled in the art can make other modifications or variations on the basis of the above embodiments. A person skilled in the art should understand that the above particular descriptions are only for the purpose of interpreting the present disclosure better, and the protection scope of the present disclosure shall be subjected to the protection scope of the claims.

What is claimed is:

1. An engine-and-electric-machine assembly, comprising an engine and an electric machine, a crankshaft being provided in the engine, the crankshaft comprising a main body and an extension section that extends out to the exterior of the engine, the extension section forming a rotation shaft of the electric machine, a rotor of the electric machine being mounted on the extension section, and a transition section being provided between the main body of the crankshaft and the extension section, wherein the transition section comprises a main body and a flange, the flange faces the rotor of the electric machine, a connecting neck is provided between the main body and the flange, a diameter of the connecting neck is less than a diameter of the main body and a diameter of the flange, and the rotor of the electric machine is fastened to the transition section via the flange.

2. The engine-and-electric-machine assembly according to claim 1, wherein the transition section is provided with an end face that faces the rotor of the electric machine, and the rotor of the electric machine is connected to the end face of the transition section via the flange.

3. The engine-and-electric-machine assembly according to claim 2, wherein the rotor of the electric machine comprises an iron-core support, a plurality of main connecting holes are provided at a middle part of the iron-core support, a plurality of secondary connecting holes are correspondingly provided at the end face of the transition section, and the main connecting holes and the secondary connecting holes are aligned and are fastened together by using bolts.

4. The engine-and-electric-machine assembly according to claim 3, wherein a protrusion that faces the transition section is provided at the middle part of the iron-core support, and the main connecting holes are provided at the protrusion.

5. The engine-and-electric-machine assembly according to claim 3, wherein a sleeve is provided at a middle part of the iron-core support, and the sleeve is interference-fitted to the extension section when the rotor of the electric machine is mounted on the extension section to guarantee that the sleeve is concentric with the rotation shaft.

6. The engine-and-electric-machine assembly according to claim 5, wherein a synchro-resolver rotor is mounted and fixed to the sleeve, or a synchro-resolver rotor is mounted and fixed to the extension section.

7. The engine-and-electric-machine assembly according to claim 5, wherein the extension section is provided with a plurality of stepped sections whose diameters sequentially and gradually decrease from a position of the extension section that is connected to the transition section to a tip of the extension section, the sleeve is interference-fitted to a first stepped section of the stepped sections, and an auxiliary bearing is mounted and fixed to one of the middle stepped sections to support the rotation shaft.

8. The engine-and-electric-machine assembly according to claim 3, wherein the main connecting holes are unthreaded holes, the secondary connecting holes are threaded holes, and a quantity of the main connecting holes and the secondary connecting holes is 6-12.

9. The engine-and-electric-machine assembly according to claim 3, wherein a sleeve is provided at a middle part of the iron-core support, and the sleeve is transition-fitted or clearance-fitted to the extension section when the rotor of the electric machine is mounted on the extension section.

\* \* \* \* \*